United States Patent Office 2,863,755
Patented Dec. 9, 1958

2,863,755

OIL-TREATED CALCIUM CARBIDE FOR DESULFURIZATION OF IRON

Edward F. Kurzinski, Cranford, N. J., assignor to Union Carbide Corporation, a corporation of New York No Drawing. Application April 22, 1957
Serial No. 654,069

9 Claims. (Cl. 75—53)

This invention relates to a process for treating a ferrous melt and more particularly concerns a product and process for reducing the sulfur content of a ferrous melt.

In the past, several difficulties have been encountered in the desulfurization of iron using a desulfurizing agent. One of the most important of these difficulties concerns incomplete utilization of the sulfur-removing potential of the desulfurizing agent. For example, in the desulfurization of molten iron where calcium carbide is used as a desulfurizing agent, a reaction takes place between the solid calcium carbide particles and the sulfur present in the melt. The desulfurization reaction takes place at the surface of the calcium carbide particles, resulting in the formation of a calcium sulfide layer on each of the calcium carbide particles. In effect, this action sharply reduces the rate at which the unreacted core of each calcium carbide particle reacts to form calcium sulfide. In addition, due to its relatively low density, the calcium carbide tends to float to the surface of the melt and gather in clusters, thereby reducing the surface area exposed for reaction with the sulfur content in the melt. Consequently, the reaction time that may be efficiently utilized is limited by the time it takes the calcium carbide particles to rise to the surface of the melt.

In order that the desulfurizing action of calcium carbide may function with maximum efficiency, it is necessary that these difficulties be substantially eliminated.

It is, therefore, an important object of the present invention to provide means for improving the desulfurizing action accompanying the addition of calcium carbide into a ferrous melt.

Another object of the present invention is to provide improved means for facilitating the handling and flow of calcium carbide through dispenser and injector devices.

According to the present invention, the desulfurizing action that takes place upon the introduction of calcium carbide into hot metal may be substantially improved by employing a grade of the calcium carbide which has been treated to increase its active surface area. The treatment consists in providing in a suitably crushed preparation of calcium carbide, an oil which is capable of rapidly vaporizing when introduced into molten metal. Upon the addition of the oil-containing calcium into the metal bath the intensity of the oil volatilization produces an agitating effect and greatly improves the desulfurizing action of the calcium carbide.

While the reason for this phenomenon is not entirely understood and I do not wish to be bound by any particular theory, it is believed that the rapid gasification of the oil tends to disperse the clusters of calcium carbide as well as disintegrate the particles of calcium carbide. As a consequence, additional reactive surface is presented to the sulfur in the molten metal. In addition the oil vapors formed as a result of rapid gasification produce a vigorous stirring action so that a more complete reaction between the calcium carbide and the sulfur in the bath is effected. Moreover, it is believed that the oil contributes in some measure to the reducing conditions in molten iron, which conditions are favorable for desulfurization. Also, the oil decreases the tendency of the carbide particles to slake and form calcium hydroxide on the surface thereof. Thus the oil prevents a decrease in the reactive surfaces of the calcium carbide particles.

In order to provide a large active surface area, it is essential that the calcium carbide to be used in the practice of the present invention be in finely divided form and of such particle size as to pass through a 14 mesh screen (1.168 mm. openings) and a substantial portion, at least about 80%, be retained on a 200 mesh screen (0.074 mm. openings).

From many tests on calcium carbides treated with a variety of different commercial oils, it has been determined that the oil to be used for improving the desulfurizing potential of the carbide particles in accordance with the invention may be any oil which will not retard or inhibit the desulfurizing function of the calcium carbide. Oils that have been found to be admirably suitable in enhancing the desulfurizing property of calcium carbide fall within an overall range of specific gravity of from about 0.76 to 0.98, in amounts by weight from not more than 4.0% to as little as 0.25%, about 1% to 2% being preferred. Other organic materials that are susceptible of use in the practice of the present invention, such as gasoline or waxes may have densities as low as 0.66 and as high as 1.20, respectively.

Examples of oils and other materials which are suitable in the practice of the invention are as follows:

| Material | Density (grams per cc.) |
|---|---|
| Petroleum oils, i. e. S. A. E. 10 oil | [1] 0.76-0.97 |
| Gasoline | 0.66-0.69 |
| Kerosene | 0.82 |
| Vegetable oils, i. e. linseed oil | 0.91-0.95 |
| Animal and fish oils, i. e. menhaden oil | 0.87-0.98 |
| Waxes, i. e. paraffin wax | 0.87-1.04 |
| Synthetic waxes | 0.80-1.20 |

[1] American Petroleum Institute designation 14°-54°.

In the present invention, a preferred treating agent for the calcium carbide is SAE No. 10 oil or Vickers Hydraulic Oil.

According to the invention, the desulfurization of an iron melt, using oil-treated calcium carbide may be carried out by entraining the carbide in a gas carrier such as nitrogen and injecting the carbide-laden gas carrier into the iron. A suitable injection apparatus for this purpose may comprise an injection tube partially immersed in the molten metal, such as illustrated in the copending application of C. E. Bieniosek et al., S. N. 427,308, filed May 3, 1954. With consideration for the tendency of calcium carbide to react with water, the gas should be dry. Examples of gases that may be suitable for use in the present invention are argon, helium, carbon dioxide, natural gas, dry air and other hydrocarbons such as propane, ethane, and methane, nitrogen being preferred.

In order to indicate still more fully the nature of the present invention, results of tests showing the effects of calcium carbide additives, either containing calcium carbide individually or in combination with the oil additive of the invention in ferrous melts are tabulated below in Table I, it being understood these tests are intended as illustrative only and that they are not intended to limit the scope of the invention.

The oil-treated calcium carbide was made by spraying either S. A. E. No. 10 motor oil or Vickers Hydraulic Oil over 14 x 200 carbide granules at a temperature of about 150° C. The sulfur containing melts were similar in composition to either blast furnace iron or ordinary foundry iron. In each test, two 200 pound baths of molten metal of substantially identical composition were prepared and a sufficient quantity of plain calcium carbide was added to react with all of the contained sulfur on one of the baths while a sufficient quantity of the oil-treated calcium carbide of the invention was added to the other bath. The sulfur content before and after treatment was tabulated and the consumption of calcium carbide per 0.01% sulfur reduction per ton of melt was compiled.

Table I

| Type Iron | Percent oil in Calcium Carbide | | Percent Sulfur in melt | | Calcium Carbide Consumption per 0.01% S per ton melt | Calcium Carbide Consumption Ratio [1] |
|---|---|---|---|---|---|---|
| | S. A. E. No. 10 | Vickers | Initial | Final | | |
| Hot Metal | 1 | | 0.085 | 0.038 | 6.39 | 1.42 |
| Do | | | 0.085 | 0.052 | 9.10 | |
| Do | 1 | | 0.070 | 0.044 | 8.75 | 1.52 |
| Do | | | 0.070 | 0.050 | 13.30 | |
| Do | | | 0.074 | 0.038 | 5.35 | 1.23 |
| Do | | 1 | 0.074 | 0.031 | 4.36 | |
| Foundry | | | 0.084 | 0.049 | 5.58 | 1.28 |
| Do | | 1 | 0.084 | 0.060 | 3.96 | |
| Do | | | 0.106 | 0.062 | 4.43 | 2.21 |
| Do | | 1 | 0.106 | 0.068 | 2.00 | |
| Do | | | 0.069 | 0.026 | 4.12 | 0.99 |
| Do | | 1 | 0.069 | 0.026 | 4.15 | |
| Do | | | 0.089 | 0.066 | 8.17 | 2.72 |
| Do | | 1 | 0.089 | 0.026 | 3.02 | |
| Hot Metal | | | 0.051 | 0.032 | 9.60 | 1.35 |
| Do | 1 | | 0.051 | 0.023 | 7.10 | |
| Do | | | 0.044 | 0.025 | 9.40 | 0.94 |
| Do | 0.5 | | 0.044 | 0.024 | 10.00 | |
| Do | | | 0.053 | 0.038 | 12.10 | 1.86 |
| Do | 2.0 | | 0.053 | 0.022 | 6.50 | |
| Do | | | 0.052 | 0.016 | 5.50 | 1.22 |
| Do | 2.0 | | 0.052 | 0.012 | 4.50 | |

[1] Calculated as: $\frac{\text{lb. CaC}_2 \text{ plain per 0.01\% S per ton iron}}{\text{lb. CaC}_2 \text{ oil-treated per 0.01\% S per ton iron}}$ From the above results it will be seen that for a given quantity of calcium carbide, the oil-treated carbide of the invention is substantially more effective in the desulfurization of a ferrous melt than plain calcium carbide, and that the oil treatment of calcium carbide results in substantial reductions in carbide consumption ranging up to about 65%.

It is to be understood that the term "calcium carbide" as used hereinabove is intended to include commercial preparations of calcium carbide which may contain up to 20% calcium oxide and the usual commercial impurities.

It will be understood that modifications and variations may be effected without departing from the spirit and scope of the novel concepts of the invention.

What is claimed is:

1. An additive material for facilitating the removal of sulfur from a ferrous melt, containing between 0.25% and 4.0% oil and the remainder calcium carbide and incidental impurities.

2. A calcium carbide-bearing addition for a sulfur-bearing ferrous melt including oil as an agent for increasing the reactive surface area of said calcium carbide and for promoting reaction with and removal of the sulfur in said melt, said calcium carbide being present in an amount between 96% and 99.75% by weight of the addition.

3. In the manufacture of steel from a sulfur-containing iron melt wherein calcium carbide is employed as an additive material for reducing the sulfur content in said melt, the improvement which comprises introducing as a sulfur reducing agent in said iron melt, a mixture of calcium carbide and oil, said oil being present in an amount between 0.25% and 4% by weight of the calcium carbide.

4. A method of reducing the sulfur content of a ferrous melt, which method comprises forming a mixture of oil and calcium carbide and adding said mixture in a carrier gas to said melt, whereby said oil rapidly volatilizes thereby agitating said melt and promoting the reaction between said sulfur content and said calcium carbide.

5. In the manufacture of steel, the improvement which comprises preparing a bath of molten sulfur-containing steel, introducing into said bath a stream of nitrogen gas having entrained therein a mixture containing oil and calcium carbide, whereby said oil quickly volatilizes and turbulently agitates said melt, thereby promoting the reaction between the contained sulfur and said calcium carbide and substantially reducing the sulfur content of said melt.

6. In the treatment of a sulfur-containing ferrous melt wherein finely divided calcium carbide is introduced into said melt as a desulfurizing agent, the improvement of increasing the reactive surface area of said calcium carbide, said improvement comprising disintegrating the finely divided calcium carbide in the melt by oil treating said calcium prior to its introduction.

7. Method for the desulfurization of molten iron, which comprises injecting into the molten iron calcium carbide of 14 x 200 mesh size treated with between 0.25% and 4.0% oil and entrained in a stream of carrier nitrogen gas, to disintegrate the particles of calcium carbide by the resultant gasification of the oil when introduced into the molten iron.

8. An additive material for facilitating the removal of sulfur from a ferrous melt, containing between 1.0% and 2.0% oil and the remainder calcium carbide and incidental impurities.

9. Method for the desulfurization of molten iron, which comprises injecting into the molten iron calcium carbide of 14 x 200 mesh size treated with between 1.0% and 2.0% oil and entrained in a stream of carrier nitrogen gas, to disintegrate the particles of calcium carbide by the resultant gasification of the oil when introduced into the molten iron.

References Cited in the file of this patent

UNITED STATES PATENTS

| | | |
|---|---|---|
| 1,836,196 | Snelling | Dec. 15, 1931 |
| 2,577,764 | Hulme | Dec. 11, 1951 |